United States Patent [19]

David

[11] Patent Number: 4,730,488

[45] Date of Patent: Mar. 15, 1988

[54] WINDSOCK WITH WIND SPEED INDICATORS

[75] Inventor: Edward David, Cottekill, N.Y.

[73] Assignee: The Spark Corp., New York, N.Y.

[21] Appl. No.: 6,375

[22] Filed: Jan. 23, 1987

[51] Int. Cl.$^4$ .............................................. G01W 1/02
[52] U.S. Cl. ................................................... 73/189
[58] Field of Search .................... 73/188, 189; 116/173

[56] References Cited

U.S. PATENT DOCUMENTS 2,617,298 11/1952 Grinley.
3,696,672 10/1972 Lindsay.
4,286,463 9/1981 Cole.

Primary Examiner—Charles A. Ruehl
Attorney, Agent, or Firm—Kenyon & Kenyon

[57] ABSTRACT

A windsock used for indicating wind direction is provided on an upper side with a multiplicity of spaced chevrons for enhancing the detection of wind direction. The chevrons are spaced from one another by such distances that each chevron represents the addition of 4 or 5 knots to the prevailing wind velocity. Accordingly, if 4 chevrons are visible from above, the prevailing wind speed is 4 to 5 knots greater than if only 3 chevrons are visible from above.

17 Claims, 8 Drawing Figures

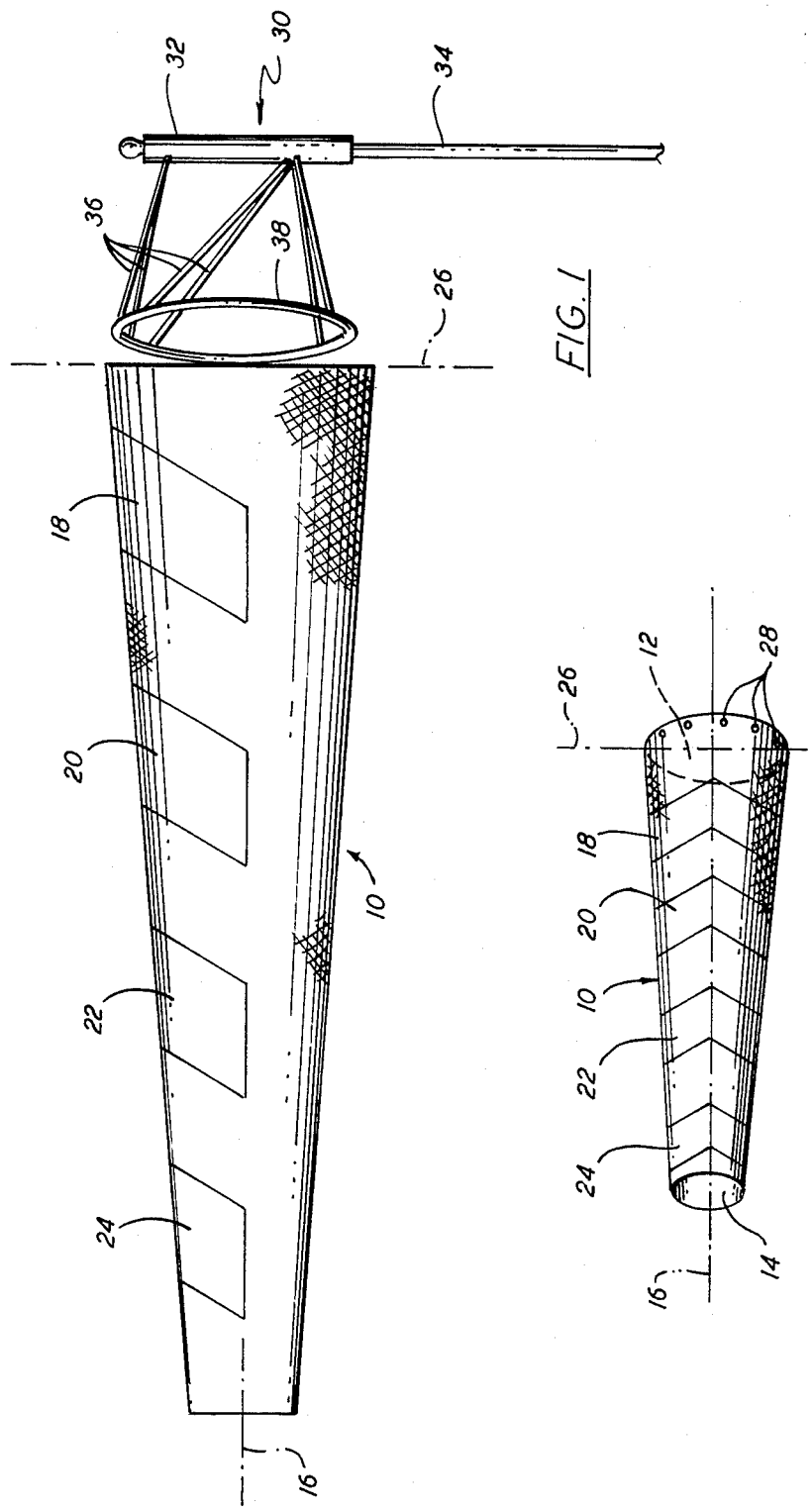

WINDSOCK WITH WIND SPEED INDICATORS

BACKGROUND OF THE INVENTION

This invention relates to a windsock of the type installed at airports for indicating wind direction to pilots.

Windsocks generally comprise a tapered tube of flexible material with a large opening at one end and a smaller opening at an opposite end. The tube is attached to a frame in turn rotatably supported on a vertical post for rotation about a vertical axis in accordance with wind direction. In conventional windsocks, the speed of the wind is roughly indicated by the extent to which the windsock is inflated by the prevailing wind.

An object of the present invention is to provide an improved windsock of the above-described type.

Another, more particular, object of the present invention is to provide such a windsock with means for enhancing visual detection of the windsock and of an angular orientation of the windsock about an axis of rotation.

Yet another particular object of the present invention is to provide such a windsock with improved means for indicating wind speed.

A further object of the present invention is to provide such a windsock with water drainage elements.

SUMMARY OF THE INVENTION

A device for indicating wind direction comprises, in accordance with the present invention, an elongate tapered tube of flexible material having a first opening at one end and a second opening at an opposite end. The tube has, in an extended configuration, an axis of symmetry extending from the first opening to the second opening, the second opening having a smaller area than the first opening. A plurality of discrete irregular geometrical shapes are disposed on an outer surface of the tube and on one side thereof for enhancing visual detection of the tube and of an angular orientation thereof about an axis oriented substantially perpendicularly to the axis of symmetry of the tube at the first opening thereof. The geometrical shapes are spaced from one another along a line extending from the first opening toward the second opening and are oriented to define a direction extending along that line. Each of the geometrical shapes is visually contrasting with respect to portions of the tube located between adjacent geometrical shapes, while each of those shapes has a point pointing along the line defined by the entire set of geometrical shapes.

Pursuant to particular features of the present invention, the irregular geometrical shapes are geometrically similar and take the form of chevrons pointing from the second opening towards the first opening. Preferably, the chevrons are colored black and are greater than three in number, the chevrons being spaced from one another so that the number of chevrons visible from one side of the tube (i.e., from the upper side thereof in an installed state of the tube) provides a substantially accurate indication of wind speed magnitude.

In accordance with yet another particular feature of the present invention, the tube is provided on a side opposite the chevrons with a plurality of spaced apertures for enabling drainage of water from an inner surface of the tube.

BRIEF DESCRIPTION OF THE INVENTION

FIG. 1 is an exploded side elevational view of a device for indicating wind direction, in accordance with the present invention, showing a windsock and a rotatable support frame.

FIG. 2 is a perspective view, on a smaller scale and taken generally from the top in FIG. 1, of the windsock illustrated in that drawing figure.

DETAILED DESCRIPTION

Figure 3:
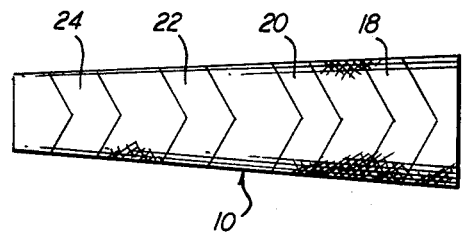
FIG. 3 is a top view of the windsock of FIGS. 1 and 2 in a totally inflated or extended configuration.

As illustrated in FIGS. 1 and 2, a device for indicating wind direction and wind speed comprises, in accordance with the invention, an elongate tapered tube 10 of flexible material such as urethane-coated packcloth having a first opening 12 at one end and a second opening 14 at an opposite end. Opening 14 has a smaller area than opening 12. Tube 10 has an axis of symmetry 16 extending from opening 12 to opening 14. In an extended or inflated configuration of tube or windsock 10, openings 12 and 14 define respective planes oriented perpendicularly to axis of symmetry 16.

On an outer surface and on one side, tube 10 is provided with several discrete irregular geometrical shapes in the form of geometrically similar chevrons 18, 20, 22 and 24 for enhancing visual detection of the windsock and of an angular orientation of the windsock about an axis 26 oriented substantially perpendicularly to axis of symmetry 16 at opening 12.

Chevrons 18, 20, 22 and 24 are spaced from one another along a line extending from opening 12 to opening 14 and may take the form of separate pieces of material stitched or otherwise attached to tube or windsock 10. Preferably, the chevrons are printed or silkscreened onto the windsock material and are visually contrasting with respect to portions of tube 10 located between the chevrons. Advantageously, the chevrons are black in color while the material of tube 10 is a flourescent orange.

As illustrated in FIG. 2, the chevrons point from opening 14 towards opening 12. Although this is the preferred orientation of the chevrons, it is also possible for the chevrons to point in the opposite direction.

Windsock or tube 10 is provided with a multiplicity of equispaced apertures 28 disposed in a circular array along an edge of tube 10 defining opening 12. Apertures 28 serve to facilitate the attachment of the windsock to a support frame 30 shown in FIG. 1. Frame 30 includes a tubular member 32 provided internally with bearings (not illustrated) and rotatably mountable to an upper end of a vertical rod or post 34. A plurality of struts or rods 36 extend from tubular member 32 to a circular wire or rod element 38. Upon attachment of tube or windsock 10 to frame 30, wire 38 traverses apertures 28, whereby the windsock is mounted to the frame.

Figure 4:
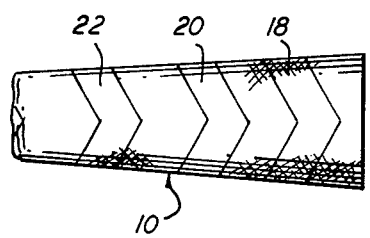
FIGS. 4-6 are schematic top views of the windsock of FIGS. 1-3 in partially inflated or extended states.
Figure 5:
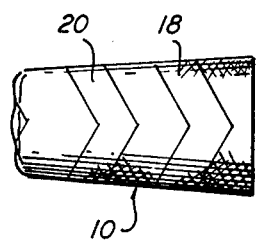
Figure 6:
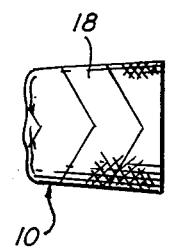

Chevrons 18, 20, 22 and 24 are spaced at such distances from one another that each chevron represents an increment preferably of 4 or 5 knots of wind velocity. In a fully extended or inflated windsock 10 (see FIG. 3), all four chevrons 18, 20, 22 and 24 are visible from above and indicate a prevailing wind velocity of 20 to 25 knots. If only the first three chevrons 18, 20 and 22 are visible from above, as illustrated in FIG. 4, a wind velocity of 12 to 15 knots is indicated. In the case that only two chevrons 18 and 20 are visible, the wind velocity is 8 to 12 knots. A low wind of 4 or 5 knots is only enough to make one chevron 18 visible to a pilot.

Figure 7:
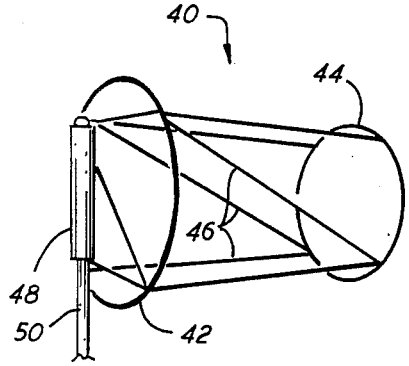
FIG. 7 is a perspective view of another support frame usable with a windsock in accordance with the present invention.
Figure 8:
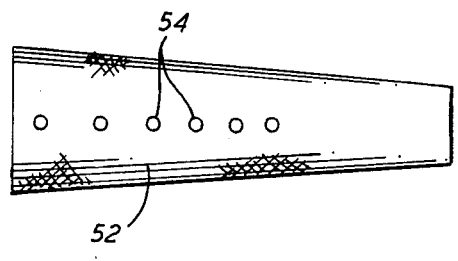
FIG. 8 is a bottom view of a windsock particularly utilizable with the support frame of FIG. 7.

As illustrated in FIG. 7, another frame 40, commonly in use for airport windsocks comprises a pair of circular wires 42 and 44 connected to one another by a plurality of linear rods 46 and mounted to a tubular bearing 48 in turn rotatably mounted to a pole 50. This frame is utilized in particular for the indication of wind direction in light winds. In accordance with a particular feature of the invention, shown in FIG. 8, a lower side of a windsock 52 is advantageously provided with a multiplicity of apertures 54 spaced from one another along a bottom side of the windsock for enabling the drainage of water from the windsock upon a mounting thereof to the frame of FIG. 7. The upper surface of the windsock of FIG. 8 is provided with chevrons as discussed hereinabove with respect to FIGS. 1 and 2.

Although the invention has been described in terms of particular embodiments and applications, one of ordinary skill in the art, in light of this teaching, can generate additional embodiments and modifications without departing from the spirit of or exceeding the scope of the claimed invention. For example, the geometrical shapes used to indicate wind direction and velocity need not take the form of chevrons but may be other discrete irregular geometrical shapes capable of indicating a direction. In addition, the geometrical shapes need not be black in color and more than four shapes may be used.

Accordingly, it is to be understood that the descriptions and illustrations herein are preferred by way of example to facilitate comprehension of the invention and should not be construed to limit the scope thereof.

What is claimed is:

1. A device for indicating wind direction, comprising:
    an elongate tapered tube of flexible material having a first opening at one end and a second opening at an opposite end, said second opening having a smaller area than said first opening;
    means for supporting said tube at said one end so that said first opening is disposed in a substantially vertical plane, said means for supporting including means for enabling rotation of said tube and of said vertical plane about a vertical axis; and
    means disposed on an upper side of said tube for enhancing visual detection of said tube and of an angular orientation of said tube about said vertical axis, said means for enhancing including a plurality of discrete irregular geometrical shapes spaced from one another along a line extending from said first opening toward said second opening, each of said geometrical shapes being oriented to define a direction extending along said line, each of said geometrical shapes being visually contrasting with respect to portions of said tube located between said geometrical shapes, each of said geometrical shapes having a point pointing along said line.

2. The device set forth in claim 1 wherein said shapes are geometrically similar.

3. The device set forth in claim 2 wherein said shapes are chevrons.

4. The device set forth in claim 3 wherein said chevrons point from said second opening towards said first opening.

5. The device set forth in claim 4 wherein said chevrons are colored black.

6. The device set forth in claim 5 wherein said chevrons are spaced from one another so that the number of said chevrons visible from above said tube indicates substantially the magnitude of wind speed.

7. The device set forth in claim 6 wherein said tube is provided on a side opposite said chevrons with means including a plurality of spaced apertures for enabling drainage of water from an inner surface of said tube.

8. A device for indicating wind direction, comprising:
    an elongate tapered tube of flexible material having a first opening at one end and a second opening at an opposite end, said tube having in an extended configuration an axis of symmetry extending from said first opening to said second opening, said second opening having a smaller area than said first opening;
    means disposed on an outer surface of said tube and on one side thereof for enhancing visual detection of said tube and of an angular orientation of said tube about an axis oriented substantially perpendicularly to said axis of symmetry at said first opening, said means for enhancing including a plurality of discrete irregular geometrical shapes spaced from one another along a line extending from said first opening toward said second opening, each of said geometrical shapes being oriented to define a direction extending along said line, each of said geometrical shapes being visually contrasting with respect to portions of said tube located between said geometrical shapes, each of said geometrical shapes having a point pointing along said line.

9. The device set forth in claim 8 wherein said shapes are geometrically similar.

10. The device set forth in claim 9 wherein said shapes are chevrons.

11. The device set forth in claim 10 wherein said chevrons point from said second opening towards said first opening.

12. The device set forth in claim 11 wherein said chevrons are colored black.

13. The device set forth in claim 12 wherein said chevrons are spaced from one another so that the number of said chevrons visible from said one side of said tube upon attachment of said tube to a vertical support indicates substantially the magnitude of wind speed past said vertical support.

14. The device set forth in claim 13 wherein said tube is provided on a side opposite said chevrons with means including a plurality of spaced apertures for enabling drainage of water from an inner surface of said tube.

15. A device for indicating wind direction, comprising:
    an elongate tapered tube of flexible material having a first opening at one end and a second opening at an opposite end, said second opening having a smaller area than said first opening;
    means for supporting said tube at said one end so that said first opening is disposed in a substantially vertical plane, said means for supporting including means for enabling rotation of said tube and of said vertical plane about a vertical axis; and
    means disposed on an upper side of said tube for enhancing visual detection of said tube and of an angular orientation of said tube about said vertical axis, said means for enhancing including a plurality of irregular geometrical shapes spaced from one another along a line extending from said first opening toward said second opening, each of said geometrical shapes being oriented to define a direction extending along said line, each of said geometrical shapes being visually contrasting with respect to portions of said tube located between said geometrical shapes, said shapes being spaced from one another so that the number of said shapes visible from said one side of said tube indicates substantially the magnitude of wind speed.

16. The device set forth in claim 15 wherein said tube is provided on a side opposite said shapes with means including a plurality of spaced apertures for enabling drainage of water from an inner surface of said tube.

17. A device for indicating wind direction, comprising:

an elongate tapered tube of flexible material having a first opening at one end and a second opening at an opposite end, said tube having in an extended configuration an axis of symmetry extending from said first opening to said second opening, said second opening having a smaller area than said first opening;

means disposed on an outer surface of said tube and on one side thereof for enhancing visual detection of said tube and of an angular orientation of said tube about an axis oriented substantially perpendicularly to said axis of symmetry at said first opening, said means for enhancing including a plurality of irregular geometrical shapes spaced from one another along a line extending from said first opening toward said second opening, each of said geometrical shapes being oriented to define a direction extending along said line, each of said geometrical shapes being visually contrasting with respect to portions of said tube located between said geometrical shapes, said shapes being spaced from one another so that the number of said shapes visible from said one side of said tube upon attachment of said tube to a vertical support indicates substantially the magnitude of wind speed past said vertical support.

* * * * *